(12) United States Patent
Kani et al.

(10) Patent No.: US 8,122,799 B2
(45) Date of Patent: Feb. 28, 2012

(54) DUST COLLECTING DEVICES FOR MACHINING APPARATUS

(75) Inventors: Toshiyuki Kani, Anjo (JP); Kenji Abe, Anjo (JP)

(73) Assignee: Makita Corporation, Anjo-shi (JP)

( * ) Notice: Subject to any disclaimer, the term of this patent is extended or adjusted under 35 U.S.C. 154(b) by 789 days.

(21) Appl. No.: 12/149,430

(22) Filed: May 1, 2008

(65) Prior Publication Data

US 2008/0276776 A1    Nov. 13, 2008

(30) Foreign Application Priority Data

May 8, 2007    (JP) ................................. 2007-123296

(51) Int. Cl.
*B26D 7/18* (2006.01)
*B27B 5/20* (2006.01)

(52) U.S. Cl. .......... 83/100; 83/468.7; 83/471.3; 83/581; 55/385.1

(58) Field of Classification Search ............... 30/124, 30/390, 391; 83/98, 100, 581, 165, 478, 83/490, 471.3, 486.1; 144/252.1, 252.2; 451/453, 456; D15/133; 55/385.1; 29/DIG. 84; 173/71

See application file for complete search history.

(56) References Cited

U.S. PATENT DOCUMENTS

| | | | |
|---|---|---|---|
| 4,675,999 A * | 6/1987 | Ito et al. ........................... | 30/124 |
| 5,121,543 A | 6/1992 | Onose et al. | |
| 5,675,895 A | 10/1997 | Mori et al. | |
| 5,819,619 A * | 10/1998 | Miller et al. .................... | 83/100 |

(Continued)

FOREIGN PATENT DOCUMENTS

| | | | |
|---|---|---|---|
| EP | 1 428 617 A1 | | 6/2004 |
| JP | 2005-96233 | * | 4/2005 |
| JP | A-2005-96233 | | 4/2005 |

*Primary Examiner* — Laura M. Lee
(74) *Attorney, Agent, or Firm* — Oliff & Berridge, PLC

(57) ABSTRACT

A dust collecting device for collecting cutting chips into a dust collecting container is provided. A back-flow preventing wall(s) is fixedly disposed on a flow path member defining a flow path between a machining apparatus and the dust collecting container. The back-flow preventing wall(s) is configured to decrease a cross sectional area of a flow path part defined by the flow path member in a downstream direction with respect to the flow of the air containing the cutting chips toward the dust collecting container.

12 Claims, 6 Drawing Sheets

U.S. PATENT DOCUMENTS

| | | | |
|---|---|---|---|
| 6,167,626 B1 * | 1/2001 | Doumani et al. | 30/124 |
| 6,641,634 B2 * | 11/2003 | Reich et al. | 55/385.1 |
| 6,830,507 B2 * | 12/2004 | Reich et al. | 451/453 |
| 7,799,104 B2 * | 9/2010 | Valentini | 55/337 |
| 2002/0152731 A1 | 10/2002 | Reich et al. | |
| 2004/0226272 A1 * | 11/2004 | Valentini | 55/385.1 |

* cited by examiner

DUST COLLECTING DEVICES FOR MACHINING APPARATUS

This application claims priority to Japanese patent application serial number 2007-123296, the contents of which are incorporated herein by reference.

BACKGROUND OF THE INVENTION

1. Field of the Invention

The present invention relates to dust collecting devices for use with the machining apparatus, such as table circular-saws for cutting workpieces, e.g., wood, so that cutting chips produced during the cutting operation can be collected by the collecting devices.

2. Description of the Related Art

Known table circular saws have a table and a saw unit. A workpiece can be placed on the table. The saw unit is vertically pivotally supported on the table and has an electric motor and a circular saw blade that is rotatably driven by the motor. Therefore, as an operator pivots the saw unit downward, the rotating circular saw may cut the workpiece placed on the table.

Some known table circular saws have dust collecting devices for collecting the cutting chips produced during the cutting operation to favorably maintain the surrounding working environment. Known dust collecting devices have a simple construction including a dust bag connected to a dust discharge pipe disposed at the rear portion of a blade case of a saw unit of a table circular saw. The blade case covers substantially the upper half of a saw blade. Therefore, as the saw blade rotates during the cutting operation, a flow of air is produced within the blade case, so that the air flows into the dust bag together with the cutting chips to the result that the cutting chips are collected by the dust bag. However, this type of dust collecting device has a problem that the collected dust may flow back toward the saw unit, because the dust bag as well as the dust discharge pipe moves (or inclines) as the saw unit vertically pivots.

In order to solve this problem, Japanese Laid-Open Patent Publication No. 2005-96233 has proposed to provide a back-flow preventing valve disposed within a dust discharge pipe of a saw unit. The valve can be opened by the force of flow of air produced by the rotating saw blade, so that dust can be collected by the dust bag. On the other hand, the valve can be closed by its gravity force or by a suitable biasing device when the rotation of the saw blade has been stopped, so that the collected dust can be prevented from flowing back toward the saw unit.

However, in the case of the dust collecting device of this publication, if the force of flow of air (i.e., an air-blowing force) produce by the rotating saw blade is not sufficient, the valve may not be opened enough. In such a case, the cutting chips may not be successfully moved into the dust bag to result lower dust collecting efficiency.

Therefore, there has been a need for a dust collecting device that can stably and effectively collect dust.

SUMMARY OF THE INVENTION

One aspect according to the present invention includes a dust collecting device for collecting cutting chips produced by a machining apparatus into a dust collecting container via a flow path. The dust collecting device includes a back-flow preventing wall(s) for preventing the cutting chips from flowing back from the dust collecting chamber toward the machining apparatus that produces the cutting chips. The back-flow preventing wall(s) is fixed to a flow path member that constitutes a part of the flow path. The flow path member may be a part of an adaptor used for attaching the dust collecting container to a dust discharge pipe provided to the machining apparatus or may be the dust discharge pipe.

DETAILED DESCRIPTION OF THE INVENTION

Figure 1:
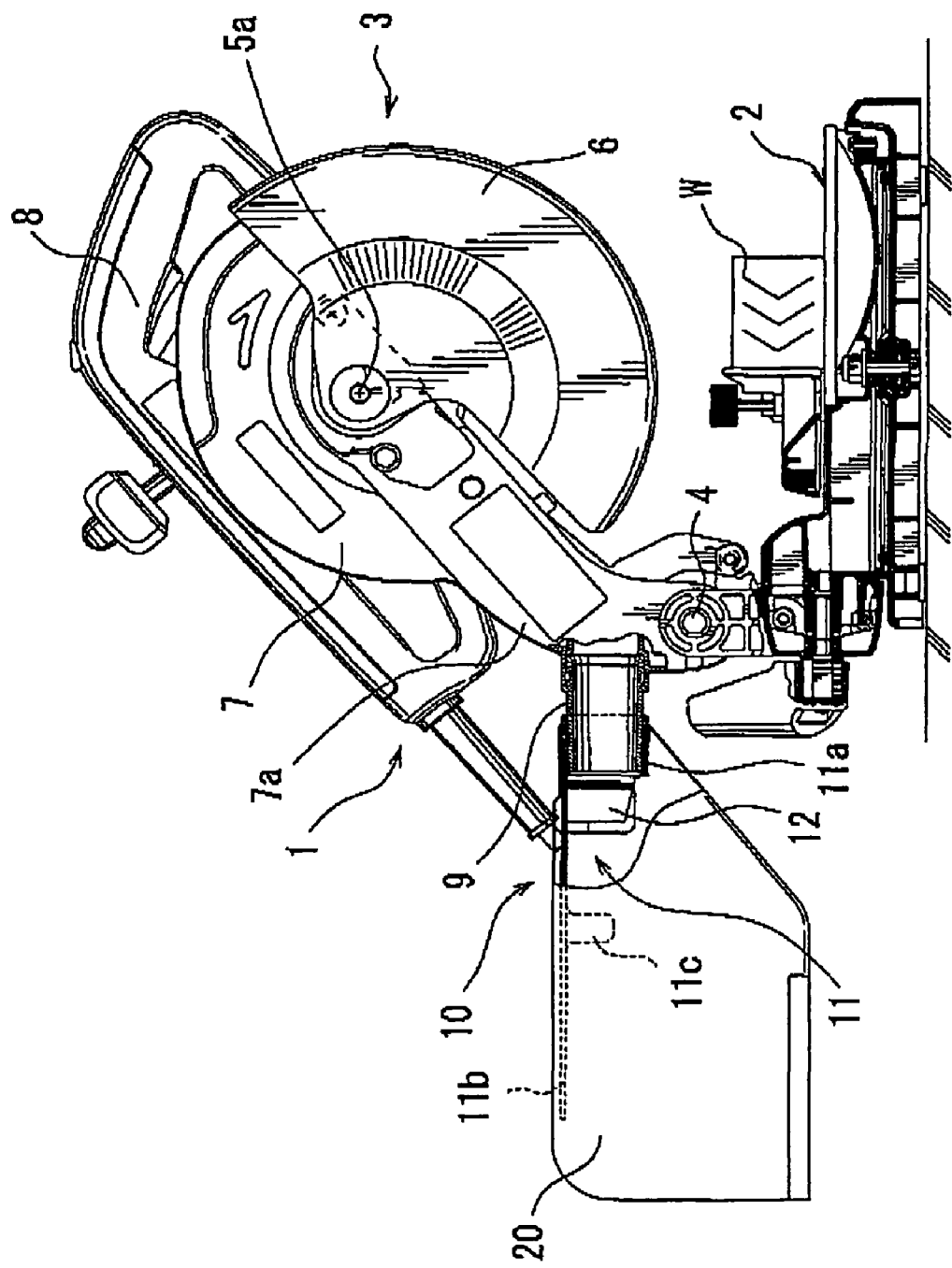
FIG. 1 is a front view of a table circular saw incorporating a dust collecting device according to a first embodiment of the present invention and showing a saw unit in an uppermost position or a rest position.

Each of the additional features and teachings disclosed above and below may be utilized separately or in conjunction with other features and teachings to provide improved dust collecting devices and back-flow preventing devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a dust collecting device includes at least one back-flow preventing wall fixedly disposed on a flow path member and configured to decrease a cross sectional area of a flow path part defined by the flow path member in a downstream direction with respect to the flow of the air containing the cutting chips toward a dust collecting container.

Because the at least one back-flow preventing wall is fixedly disposed on the flow path member, it is possible to stably collect the dust without depending on the force of air flowing from the side of a machining apparatus toward the dust collecting container by the rotating rotary tool of the machining apparatus. In addition, because the at least one back-flow preventing wall is configured to decrease a cross sectional area of a flow path part defined by the flow path member in the downstream direction, the resistance against flow of the air containing the cutting chips into the dust collecting container can be minimized. Therefore, it is possible to prevent the cutting chips from flowing back from the dust collecting container without causing substantial reduction in dust collecting efficiency.

The at least one back-flow preventing wall may be disposed within the flow path member. The cross sectional area of the flow path part at a downstream-side end of the at least one back-flow preventing wall may be substantially the half of the cross sectional area of the flow path member. With this determination, it is possible to achieve a balance between the dust collecting function and the back-flow preventing function of the dust collecting device.

The at least one back-flow path preventing wall may have a wall part inclined obliquely relative to the direction of flow of the air containing the cutting chips entering the flow path member. With this construction, it is possible to achieve the reduction of the cross sectional area of the flow path part by a simple construction while minimizing the resistance against flow of the air toward the dust collecting container.

The dust collecting device may further include an adaptor configured to be mounted to a dust discharge pipe disposed on the machining apparatus. The dust collecting container can be attached to the adaptor. Each of the adaptor and the dust discharge pipe defines a part of the flow path, and the flow path member may be the adaptor. With this arrangement, the dust collecting container can be easily attached to and removed from the dust discharge pipe, so that the maintenance work of the dust collecting device incorporating the back-flow preventing device can be easily performed and the usability of the dust collecting device can be improved. In addition, by preparing a plurality of adaptors having differently configured back-flow preventing devices, any one of the adaptors having a suitable back-flow preventing device can be selectively used for effectively collecting the cutting chips and for effectively preventing the back-flow of the cutting chips.

The adaptor may include a container support constructed to support the dust collecting container from the inside thereof. Therefore, it is possible to maintain the configuration of the dust collecting container to be suitable for collecting the cutting chips.

In another embodiment, a back-flow preventing device includes at least one back-flow preventing wall fixedly disposed on the flow path member, so that a cross sectional area of a flow path part defined by the flow path member decreases in a downstream direction with respect to the flow of the air containing the cutting chips toward the dust collecting container.

The at least one back-flow preventing wall may extend, for example in a cantilever manner, from the flow path member in a direction substantially perpendicular to the downstream direction and may have a substantially V-shape in cross section. The at least one back-flow preventing wall may include two or more back-flow preventing walls.

Alternatively, the at least one back-flow preventing wall may include a pair of wall parts each extending from an inner wall of the flow path member toward each other and defining a space therebetween for the flow of the air containing the cutting chips.

Alternatively, the at least one back-flow preventing wall may be a tubular member defining a flow path with a cross sectional area decreasing in the downstream direction. The tubular member may include a wall part against which a part of the air containing the cutting chips flowing toward the dust collecting container can impinge. A plurality of small vent holes may be formed in the wall part for permitting the air containing the cutting chips to flow through the vent holes.

A first embodiment of the present invention will now be described with reference to FIGS. 1 to 10. An overall view of a table circular saw 1 incorporating a dust collecting device 10 according to this embodiment is shown in FIG. 1. The table circular saw 1 generally includes a table 2 and a saw unit 3 vertically pivotally supported on the table 2 via a support shaft 4. As the saw unit 3 pivots downward from an uppermost position (or a rest position) shown in FIG. 1 toward a lowermost position (or an operative position) shown in FIG. 2, a blade cover 6 rotates to uncover a circular saw blade 5 of the saw unit 3. The blade cover 6 is supported by a blade case 7 of the saw unit 3 via a support pin 6a, so that the blade cover 6 can rotate about the support pin 6a. The blade cover 6 can rotate in response to the vertical movement of the saw unit 3.

Figure 2:
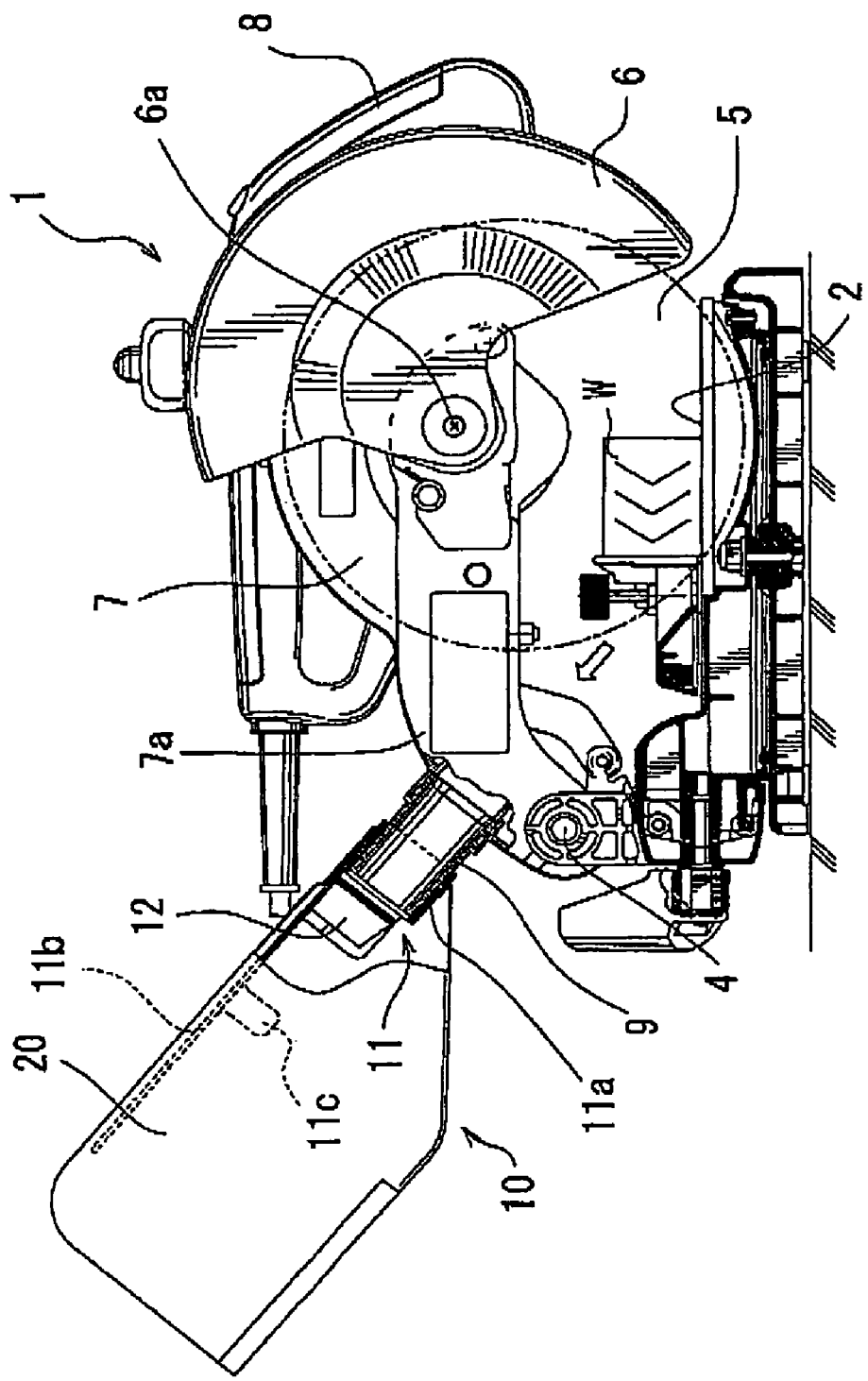
FIG. 2 is a front view of the table circular saw similar to FIG. 1 but showing the saw unit in a lowermost position or an operative position.

The blade case 7 covers substantially the upper half of the saw blade 5 and has a motor (not shown) disposed on the backside of the blade case 7 for rotatably driving the saw blade 5. In FIGS. 1 and 2, the blade case 7 is shown in a front view, and therefore, the motor cannot be seen in these figures. The saw blade 5 rotates in a clockwise direction as viewed in FIGS. 1 and 2. A handle 8 is mounted to the blade case 7, so that the operator can pivot the saw unit 3 by grasping the handle 8. During the cutting operation, the operator may be positioned on the right side as viewed in FIGS. 1 and 2 of the circular table saw 1.

A support arm 7a extends rearward (leftward as viewed in FIGS. 1 and 2) from the blade case 7, so that the saw unit 3 is supported on the table 2 via the support arm 7a. More specifically, the support arm 7a is vertically pivotally supported on the table 2 via the support shaft 4. A dust discharge pipe 9 extends rearwardly or obliquely rearwardly from the lower portion of the support arm 7a. The dust discharge pipe 9 has a cylindrical tubular configuration and has one end open into the support arm 7a. The dust collecting device 10 according to the first embodiment is attached to the dust discharge pipe 9. During the cutting operation of the workpiece, the flow of air is produced by the rotating saw blade 5 in a direction forwardly upward from a position of the workpiece as indicated by an outline arrow in FIG. 2, so that the cutting chips produced by the rotating saw blade 5 flows toward and into the dust discharge pipe 9 with the flow of air. The cutting chips are then collected by the dust collecting device 10 as will be hereinafter described.

The dust collecting device 10 generally includes an adaptor and a dust collecting container 20. The adaptor 11 is shown in detail in FIGS. 3 to 5 and may be molded as a one-piece member by a suitable molding process, and can be made of a resin. The adaptor 11 has a connector 11a, a container support 11b and a back-flow preventing wall 12. The connector 11a has a cylindrical tubular configuration with an inner diameter to allow insertion of the dust discharge pipe 9 into the connector 11a without substantial clearance. The dust collecting device 10 can be mounted to the saw unit 3 by inserting the dust discharge pipe 9 into the connector 11a. The dust connector 11a may be fixed in position relative to the dust discharge pipe 9 by the frictional contact therewith or by a suitable releasable lock device (not shown). The dust collecting device 10 can be removed from the saw unit 3 by removing the connector 11a from the dust discharge pipe 9.

The container support 11b extends rearward from the rear end (left end as viewed in FIGS. 3 and 4) and has a configuration elongated in the rearward direction. The back-flow preventing wall 12 is formed integrally with the base end (right end as viewed in FIGS. 3 and 4) of the container support 11b. The back-flow preventing wall 12 extends downward (as viewed in FIGS. 3 and 4) from the container support 11b. More specifically, the back-flow preventing wall 12 extends substantially perpendicular to the longitudinal direction of the container support 11b and is positioned between opposite side walls 11d formed on the container support 11b. The length of extension of the back-flow preventing wall 12 from the container support 11b will be hereinafter called as a height H (see FIG. 3) of the back-flow preventing wall 12.

Figure 3:
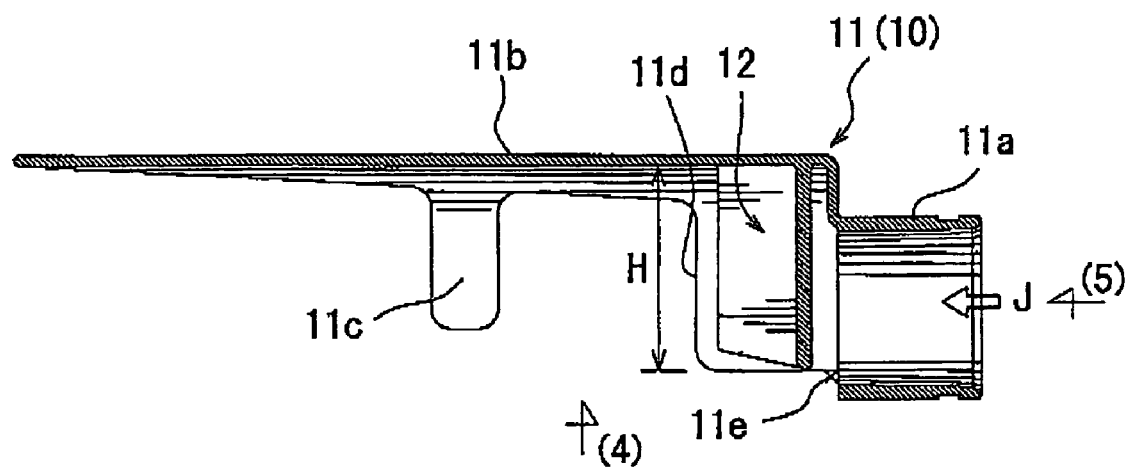
FIG. 3 is a vertical sectional view of an adaptor of the dust collecting device.

As shown in FIG. 3, the height H is determined such that the lower end of the back-flow preventing wall 12 does not extend beyond the lower edge of the inner space of the connector 11a. Therefore, a flow path 11e is defined between the lower end of the back-flow preventing wall 12 and the lower edge of the inner space of the connector 11a.

Figure 4:
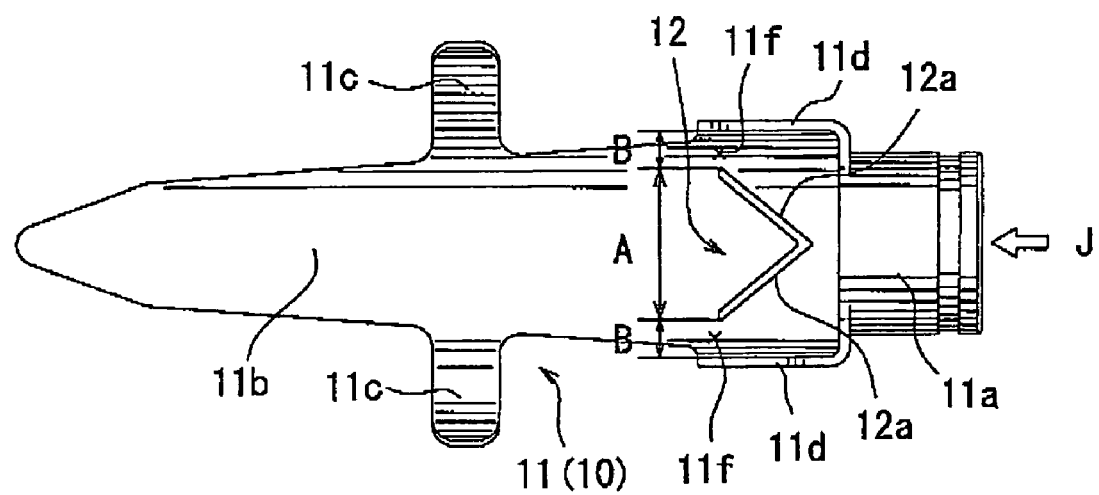
FIG. 4 is a bottom view of the adaptor as viewed in a direction of arrow (4) in FIG. 3.

The side walls 11d are formed integrally with the connector 11a and the container support 11b in a position proximal to and on the downstream side of the connector 11a. The side walls 11d are positioned on the right side and the left side as viewed from a direction of flow of the air, respectively and are spaced from each other by a predetermined distance. As shown in FIG. 4, a pair of right and left flow paths 11f are defined between the side walls 11d and side edges and right and left side edges of the back-flow preventing wall 12.

The back-flow preventing wall 12 includes a pair of wall parts 12a that extend obliquely relative to the direction of flow of air from the discharge pipe 9 (indicated by an outline arrow J in FIG. 4) and in opposite directions relative to each other. More specifically, the wall parts 12a are joined to each other at their upstream-side edges and extend obliquely from the upstream-side edges such that a distance between the wall parts 12a increases in the downstream direction. Therefore, the wall parts 12a jointly form a V-shape with its opening oriented on the downstream side, so that the cross sectional area of a flow path (i.e., an open area) defined between the back-flow preventing wall 12 and the side walls 11d gradually decreases in the upstream direction.

With this configuration of the back-flow preventing wall 12, the cutting chips once collected within the dust container 20 can be prevented from flowing back toward the dust discharge pipe 9. The back-flow preventing wall 12 can perform the back-flow preventing function irrespective of the position of the saw unit 3 including the position shown in FIG. 1 where the saw unit 3 is in the uppermost position or the rest position and the position shown in FIG. 2 where the saw unit 3 is in the lowermost position or the operative position and the dust discharge pipe 9 is inclined with its upstream side end oriented downward.

Referring to FIG. 4, the ratio of A to B*2 may be determined in relation to the height H. Here, A is a width of shielding by the wall portions 12a of the back-flow preventing wall 12a for preventing the back flow of the cutting chips. B is a width of each of the right and left flow paths 11f that permit the flow of the air containing the cutting chips. In this embodiment, the height H of the back-flow preventing wall 12 and/or the inclination angle of the wall parts 12a relative to the flow direction J are determined such that the sum of the cross sectional area of the flow path 11e (defined between the lower end of the back-flow preventing wall 12 and the lower edge of the inside of the connector 11a) and the cross sectional areas of the flow paths 11f (each having the width B) is substantially equal to the cross sectional area (having the width A) shielded by the back-flow preventing wall 12. With this determination, it is possible to achieve a balance between the dust collecting function and the back-flow preventing function of the dust collecting device 10.

Figure 5:
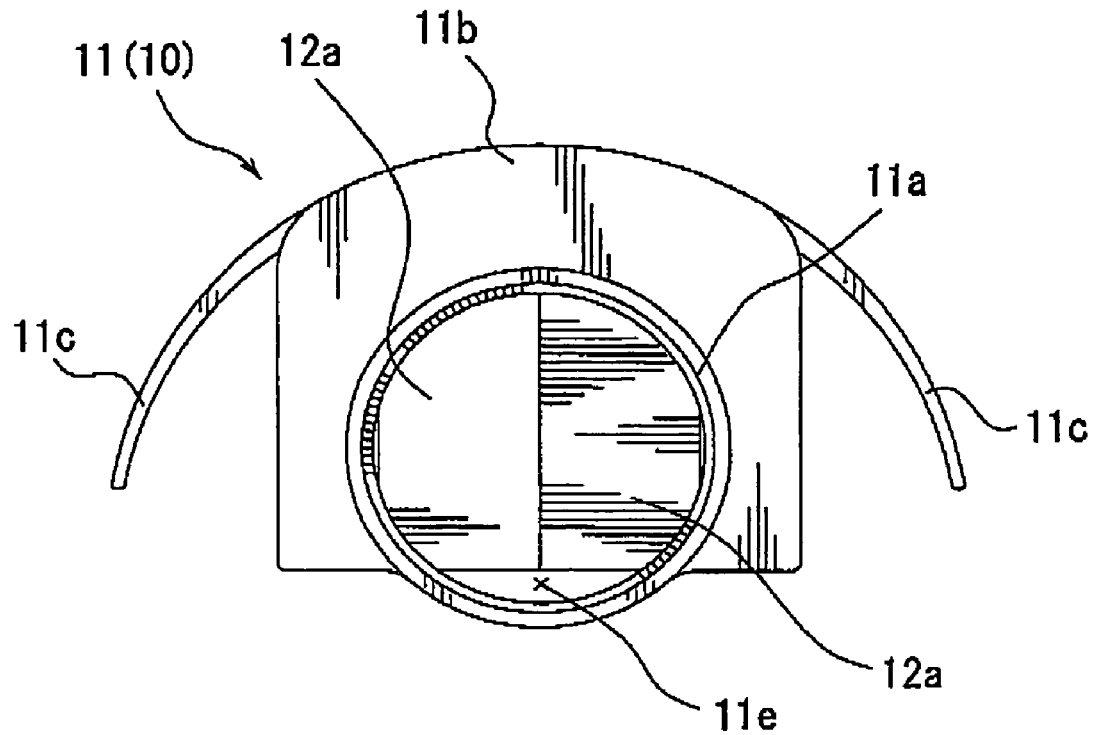
FIG. 5 is a side view of the adaptor as viewed in a direction of arrow (5) in FIG. 3 or as viewed from an upstream side.

A pair of auxiliary supports 11c are formed on opposite sides of the middle portion in the lengthwise direction of the container support 11b. More specifically, the auxiliary supports 11c extend substantially perpendicular to the longitudinal axis of the container support 11b. As shown in FIG. 5, the container support 11b and the auxiliary supports 11c are curved about the same axis as the central axis of the connector 11b. As shown in FIGS. 1 and 2, the container support 11b and the auxiliary supports 11c are inserted into the dust container 20 and serve as a framework for supporting the dust container 20 from its inside and for maintaining the configuration of the dust container 20 in an expanded state. The dust container 20 may be a bag made of cloth or the like that has flexibility and air permeability.

With the dust collecting device 10 of the above first embodiment, the back-flow preventing wall 12 extends in the downstream direction from the connector 11a that is connected to the dust discharge pipe 9 of the blade case 7. In addition, the back-flow preventing wall 12 is fixedly attached to the connector 11a. Therefore, the back-flow preventing wall 12 can reliably perform the back-flow preventing function without depending on the force of air that may vary with the rotational speed of the saw blade 5, etc.

In addition, the wall parts 12a of the back-flow preventing wall 12 extend obliquely relative to the direction of flow of air, so that the cross sectional area of the flow path on the downstream side of the connector 11 decreases successively and not in a stepwise manner in the downstream direction. Therefore, the flow of the air containing the cutting chips can be guided smoothly without producing substantial resistance against the flow, while preventing the back-flow of the cutting chips.

Further, by suitably setting the height H of the back-flow preventing wall 12, and the angle of inclination of the wall parts 12a relative to the direction J of flow of the air from the discharge pipe 9, etc., it is possible to achieve a balance between the back-flow preventing function performed by the back-flow preventing wall 12 and the dust collecting function enabled by the flow paths 11e and 11f.

Furthermore, because the back-flow preventing wall 12 is integrated with the adaptor 11 that can be removably mounted to the dust discharge pipe 9, preparing a plurality of adaptors having different back-flow preventing walls enables to exchange the adaptor in use to the other one that is suitable to the operating condition of the circular table saw 1.

Still furthermore, the disposal of the dust collected within the dust container 20 can be easily performed by removing the adaptor 11 from the dust discharge pipe 9. Therefore, the maintenance work of the dust collecting device 10 can be easily performed, and the dust collecting device 10 is improved in usability.

The above embodiment may be modified in various ways. FIGS. 6 to 10 show various modifications of the first embodiment. In FIGS. 6 to 10, like members are given the same reference numerals as the first embodiment and the description of these members will not be repeated.

Second Embodiment

Figure 6:
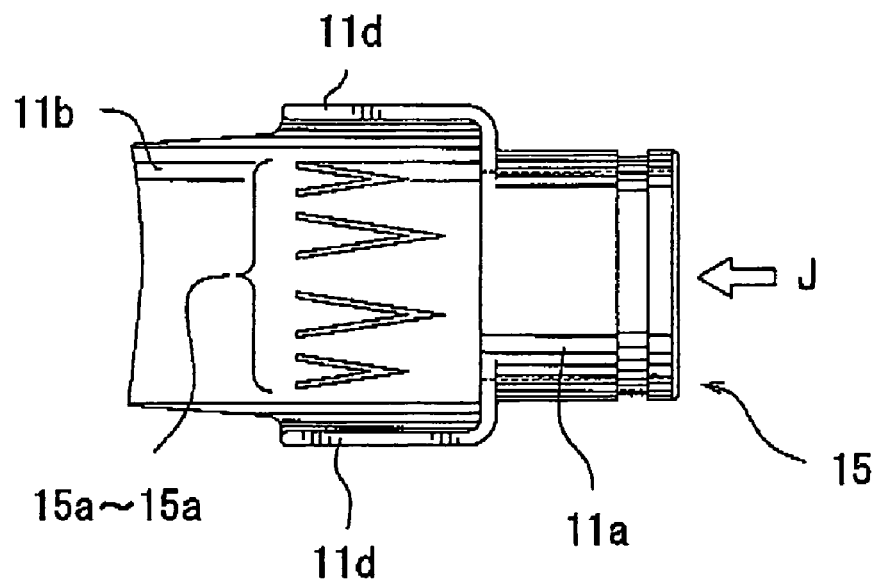
FIG. 6 is a bottom view, with a part omitted, of an adaptor of a dust collecting device according to a second embodiment of the present invention.

According to an adaptor 15 shown in FIG. 6, the back-flow preventing wall 12 of the adaptor 11 of the first embodiment is replaced with a plurality of back-flow preventing walls 15*a* that are formed integrally with the adaptor 15. In this second embodiment, four back-flow preventing walls 15*a* are arranged in a row and each has a size smaller than the back-flow preventing wall 12.

Similar to the back-flow preventing wall 12, each of the back-flow preventing walls 15*a* has a V-shape with its open side oriented in the downstream direction. The back-flow preventing walls 15*a* are arranged in a row in a direction perpendicular to the direction J of the flow of air from the discharge pipe 9 (not shown in FIG. 6) and are spaced from each other by a predetermined distance.

Also with this arrangement, the cross sectional area of the flow path decreases successively in the downstream direction from the connector 11 by the back-flow preventing walls 15*a*. Therefore, the back-flow of the cutting chips from the dust collecting container 20 can be prevented without producing substantial resistance against flow of the air into the dust collecting container 20.

Further, because the back-flow preventing walls 15*a* are fixed in position relative to the adaptor 15, the back-flow preventing function can be reliably performed without depending on the force of air.

Also with the second embodiment, by suitably setting the height H of the back-flow preventing walls 15*a*, and the angle of inclination of the wall parts relative to the direction J of flow of the air from the discharge pipe 9, etc., it is possible to achieve a balance between the back-flow preventing function performed by the back-flow preventing walls 16*a* and the dust collecting function.

Third Embodiment

Figure 7:
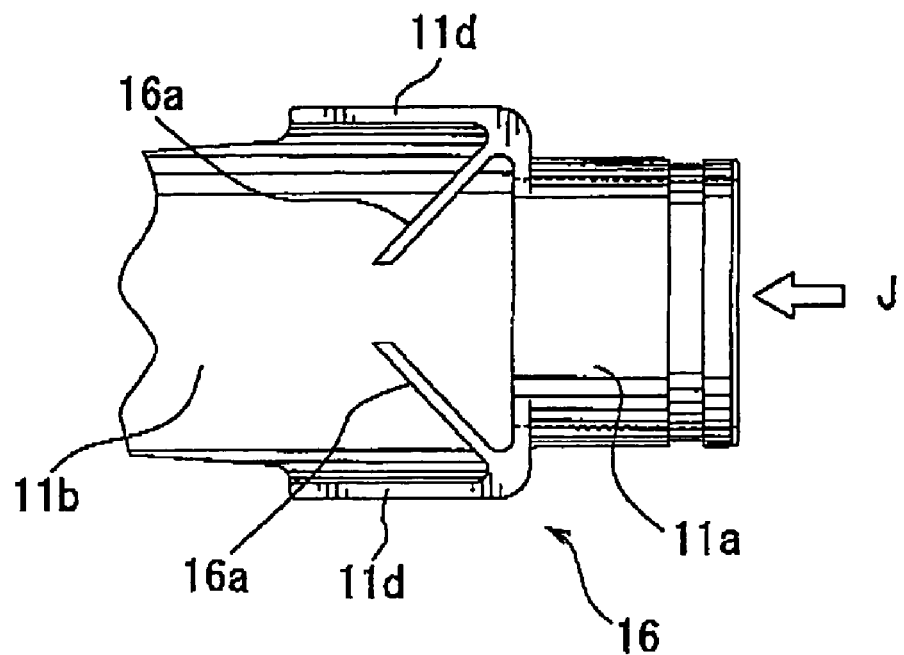
FIG. 7 is a bottom view, with a part omitted, of an adaptor of a dust collecting device according to a third embodiment of the present invention.

An adaptor 16 shown in FIG. 7 has a pair of back-flow preventing walls 16*a* that are molded integrally with the adaptor 16. The back-flow preventing walls 16*a* extend from the side walls 11*d* at positions proximal to the connector 11*a* and are inclined in directions opposite to the directions of inclination of the wall portions of the back-flow preventing walls 12*a* and 15*a* of the first and second embodiments. Thus, the back-flow preventing walls 16*a* are inclined toward each other in the direction J of the flow of air or the downstream direction, so that the width of the flow path defined between the back-flow preventing walls 16*a* successively decreases in the direction J. Also with this arrangement, the cutting chips stored within the dust collecting container 20 can be prevented from flowing back toward the dust discharge pipe 9 (not shown) without producing substantial resistance against flow of the air containing the dust.

In addition, because the back-flow preventing walls 16*a* are fixed in position relative to the adaptor 16, the back-flow preventing function can be reliably performed without depending on the force of air.

Also with the third embodiment, by suitably setting the height H of the back-flow preventing walls 16*a*, and the angle of inclination of them relative to the direction J of flow of the air from the discharge pipe 9, etc., it is possible to achieve a balance between the back-flow preventing function performed by the back-flow preventing walls 16*a* and the dust collecting function.

Fourth Embodiment

Figure 8:
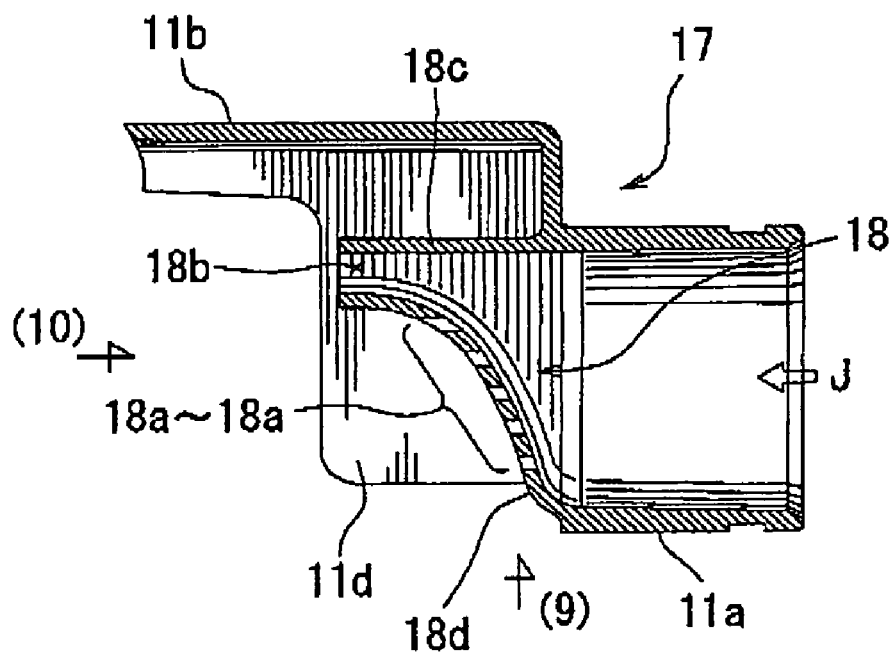
FIG. 8 is a vertical sectional view, with a part omitted, of an adaptor of a dust collecting device according to a fourth embodiment of the present invention.
Figure 9:
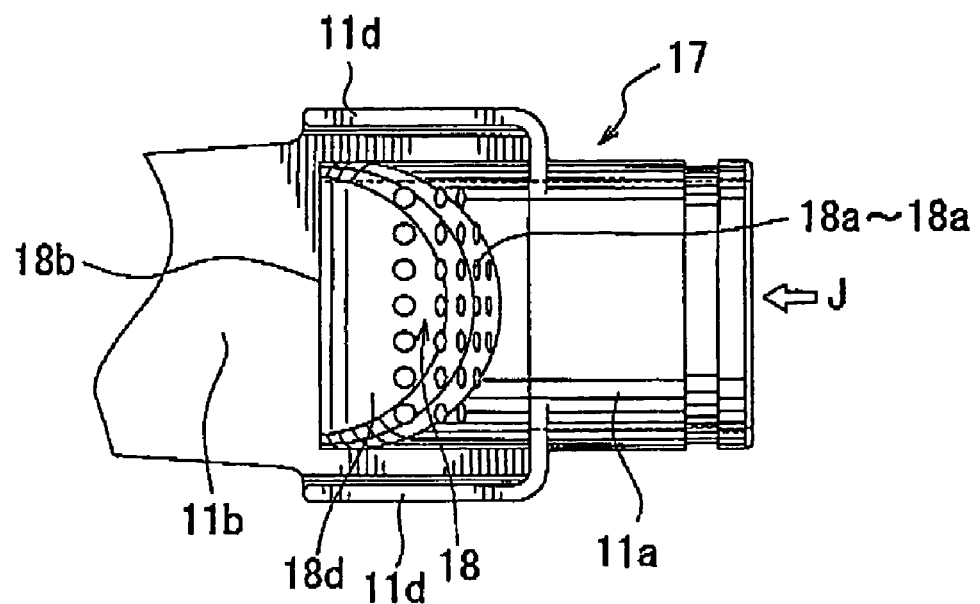
FIG. 9 is a view of the adaptor as viewed in a direction of arrow (9) in FIG. 8 and showing a bottom view of the adaptor.
Figure 10:
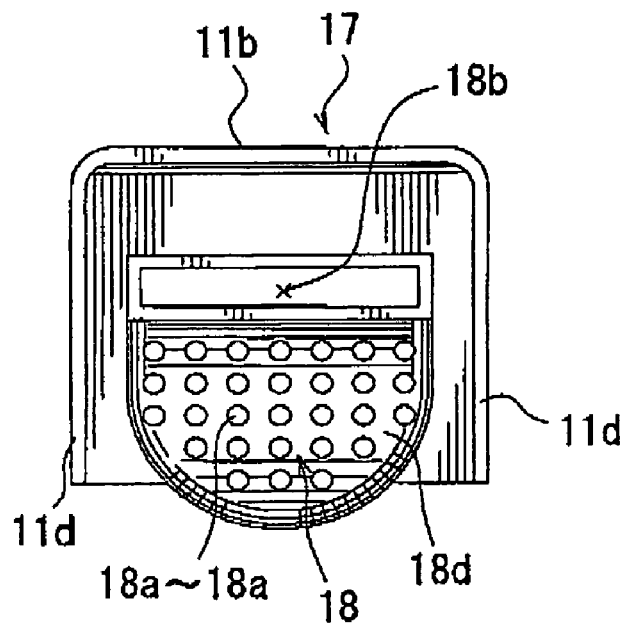
FIG. 10 is a view of the adaptor as viewed in a direction of arrow (10) in FIG. 8 or as viewed from the downstream side.

An adaptor 17 shown in FIGS. 8 to 10 also has a back-flow preventing wall 18 disposed proximally to and on the downstream side of the connector 11*a*. The back-flow preventing wall 18 is different from the back-flow preventing walls of the first to third embodiments in that the cross sectional area of the flow path is not narrowed in the widthwise direction but is narrowed in a direction perpendicular to the widthwise direction (i.e., the direction of height or the upward and downward directions as viewed in FIG. 8). The back-flow preventing wall 18 has a tube-like configuration defining a flow path 18*b* having a substantially rectangular cross section and includes an upper wall part 18*c* and a lower wall part 18*d*. The upper wall part 18*c* extends from the upper edge of the connector 11*a* in a direction substantially parallel to the container support 11*b*. The lower wall part 18*d* extends from the lower edge of the connector 11*a* and is curved upward therefrom, so that the cross sectional area of the back-flow preventing wall 18 or the flow path 18*b* successively decreases in the downstream direction. Therefore, the air containing the cutting chips can smoothly flow through the flow path 18*b*. The height of the flow path 18*b* can be suitably determined based on the height of the downstream side end of the lower wall part 18*d* from the lower edge of the connector 11*a*.

A plurality of small vent holes 18*a* are formed in the lower wall part 18*d*. Therefore, when the air containing the cutting chips impinges on the lower wall part 18*d*, a part of it can flow through the vent holes 18*a*. Therefore, the resistance against flow of the air can be reduced also by the vent holes 18*a*. In addition, the amount of flow of the air can be increased by the vent holes 8*a*. Because the vent holes 18*a* are small in diameter, it is still possible to prevent the cutting chips within the dust collecting container 20 from flowing back toward the dust discharge pipe 9.

Also with this arrangement, the cross sectional area of the flow path decreases successively in the downstream direction from the connector 11 by the back-flow preventing wall 18. Therefore, the back-flow of the cutting chips from the dust collecting container 20 can be prevented without producing substantial resistance against flow of the air into the dust collecting container 20. In addition, by the provision of the vent holes 18*a* in the lower wall part 18*d*, the air can also flow through the vent holes 18*a*, so that the air can flow smoothly also with the aid of the vent holes 18*a*.

Also with the fourth embodiment, by suitably setting the configuration of the flow path 18*b* and the number and size of the vent holes 18*a*, it is possible to achieve a balance between the back-flow preventing function performed by the back-flow preventing walls 16*a* and the dust collecting function.
(Other Possible Modifications)

Although a bag made of cloth or the like that has flexibility and air permeability is used as the dust collecting container 20 in the above embodiments, a dust collecting container made of plastic and having no flexibility and no air-permeability can be used and can be connected to the dust discharge pipe 9 via the adaptor 11 (15, 16, 17).

In addition, although the back-flow preventing wall(s) is molded integrally with the adaptor in each of the above embodiments, the back-flow preventing wall(s) may be formed separately from the adaptor and may be fixed to the adaptor by adhesion or by using fasteners, such as screws. Further, the back-flow preventing wall(s) may be formed integrally with the inner circumference of the dust discharge pipe 9 or may be fixedly attached thereto.

Further, although the above embodiments have been described in connection with the dust collecting devices for use with the circular table saw 1 having circular saw blade 5 as a machining tool, the dust collecting devices of the above embodiments may be also used with any other machining tools and apparatus, such as portable circular saws, disk grinders and hedge trimmers.

This invention claims:

1. An apparatus comprising:
a table circular saw including a rotary circular saw blade and a dust discharge pipe, the rotary circular saw blade producing a flow of air during a cutting operation of a workpiece, so that cutting chips produced by the rotary circular saw blade flow into the dust discharge pipe with the flow of air; and
a dust collecting device comprising:
   a dust collecting container; and
   an adaptor including a connector connected to the dust discharge pipe of the table circular saw, a container support disposed within the dust collecting container and configured to support the dust collecting container, and a back-flow preventing wall fixedly disposed on the container support, wherein:
   the container support includes opposite side walls, so that flow paths are defined between the side walls and the back-flow preventing wall;
   a cross sectional area of each of the flow paths decreases in a downstream direction with respect to the flow of air containing cutting chips flowing from the connector into the dust collecting container;
   the back-flow preventing wall is opposed to the connector and extends downward from the container support beyond a position opposed to a central axis of the connector;
   the back-flow preventing wall has a V-shape in a horizontal cross section, with a closed side opposite to an opening of the V-shape oriented toward a side of the connector, the back-flow preventing wall extends from the container support in a cantilever manner and in a direction substantially perpendicular to the downstream direction.

2. The apparatus as in claim 1, wherein the dust collecting container has flexibility and the container support extends within the dust collecting container along a top portion thereof.

3. The apparatus as in claim 1, wherein the connector, the container support and the back-flow preventing wall are made of resin and formed integrally with each other.

4. The apparatus as in claim 3, wherein the dust collecting container has one end attached to the connector of the adaptor.

5. The apparatus as in claim 1, wherein the container support includes a first end on a side of the connector and a second end opposite to the first end in a longitudinal direction of the container support, the back-flow preventing wall being positioned between the first end and the second end.

6. The apparatus as in claim 5, wherein the container support further includes auxiliary supports positioned between the back-flow preventing wall and the second end and extending perpendicular to the longitudinal direction of the container support.

7. A dust collecting device for a table circular saw including a rotary circular saw blade and a dust discharge pipe, the rotary circular saw blade producing a flow of air during a cutting operation of a workpiece, so that cutting chips produced by the rotary circular saw blade flow into the dust discharge pipe with the flow of air, the dust collecting device, comprising:
a dust collecting container; and
an adaptor including a connector connected to the dust discharge pipe of the table circular saw, a container support disposed within the dust collecting container and configured to support the dust collecting container, and a back-flow preventing wall fixedly disposed on the container support, wherein:
the container support includes opposite side walls, so that flow paths are defined between the side walls and the back-flow preventing wall,
a cross sectional area of each of the flow paths decreases in a downstream direction with respect to the flow of air containing cutting chips flowing from the connector into the dust collecting container,
the back-flow preventing wall is opposed to the connector and extends downward from the container support beyond a position opposed to a central axis of the connector, and
the back-flow preventing wall has a V-shape in a horizontal cross section, with a closed side opposite to an opening of the V-shape oriented toward a side of the connector, the back-flow preventing wall extends from the container support in a cantilever manner and in a direction substantially perpendicular to the downstream direction.

8. The dust collecting device as in claim 7, wherein the dust collecting container has flexibility and the container support extends within the dust collecting container along a top portion thereof.

9. The dust collecting device as in claim 7, wherein the connector, the container support and the back-flow preventing wall are made of resin and formed integrally with each other.

10. The dust collecting device as in claim 9, wherein the dust collecting container has one end attached to the connector of the adaptor.

11. The dust collecting device as in claim 7, wherein the container support includes a first end on a side of the connector and a second end opposite to the first end in a longitudinal direction of the container support, the back-flow preventing wall being positioned between the first end and the second end.

12. The dust collecting device as in claim 11, wherein the container support further includes auxiliary supports positioned between the back-flow preventing wall and the second end and extending perpendicular to the longitudinal direction of the container support.

* * * * *